United States Patent [19]

Benhase

[11] Patent Number: 4,505,626
[45] Date of Patent: Mar. 19, 1985

[54] CUTTING TOOL

[75] Inventor: Craig Benhase, Milford, Ohio

[73] Assignee: Dexport Tool Company, Inc., Cincinnati, Ohio

[21] Appl. No.: 454,723

[22] Filed: Feb. 24, 1983

[51] Int. Cl.³ .............................. B23B 51/00
[52] U.S. Cl. ............................ 408/224; 408/223; 408/227; 408/713
[58] Field of Search .......... 408/145, 188, 191, 223, 408/227, 189, 224, 239 R, 225, 228, 206, 201, 211, 200, 202, 194, 195, 222, 231, 199, 713, 226; 407/36, 40, 42, 44, 48, 113, 101

[56] References Cited

U.S. PATENT DOCUMENTS

| 3,018,675 | 1/1962 | Klages et al. | 407/101 X |
| 3,289,272 | 12/1966 | Stier | 407/113 X |
| 4,090,801 | 5/1978 | Faber | 407/113 |
| 4,133,399 | 1/1979 | Herrman | 408/713 |
| 4,197,042 | 4/1980 | Krhounek et al. | 408/713 X |
| 4,220,429 | 9/1980 | Powers et al. | 408/713 X |
| 4,252,480 | 2/1981 | Mizuao et al. | 408/223 |
| 4,265,574 | 5/1981 | Eckle | 408/239 R X |
| 4,297,058 | 10/1981 | Armbrust et al. | 407/113 |
| 4,367,991 | 1/1983 | Grafe et al. | 408/713 |
| 4,393,735 | 7/1983 | Eckle et al. | 407/101 X |

FOREIGN PATENT DOCUMENTS

| 1006901 | 10/1965 | United Kingdom | 408/226 |
| 1254578 | 11/1971 | United Kingdom | 407/48 |

Primary Examiner—William R. Briggs
Assistant Examiner—Glenn L. Webb
Attorney, Agent, or Firm—Edward J. Utz

[57] ABSTRACT

A cutting tool having an upper cylindrical body and a lower cylindrical body with flat surfaces on opposite sides of the lower cylindrical body, flutes in said lower cylindrical body and three triangular cutting elements indexible to three separate positions secured in said lower cylindrical body and means for detachably securing said triangular cutting elements, one of said cutting elements having three cutting edges for each position and the other two of said cutting elements having one cutting edge for each position.

1 Claim, 9 Drawing Figures

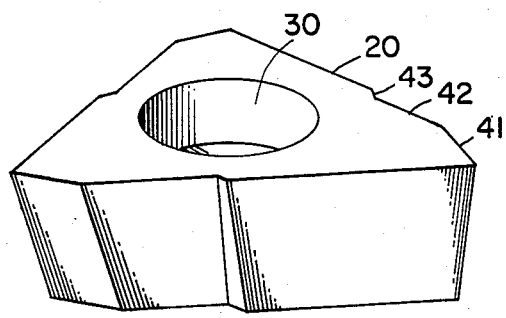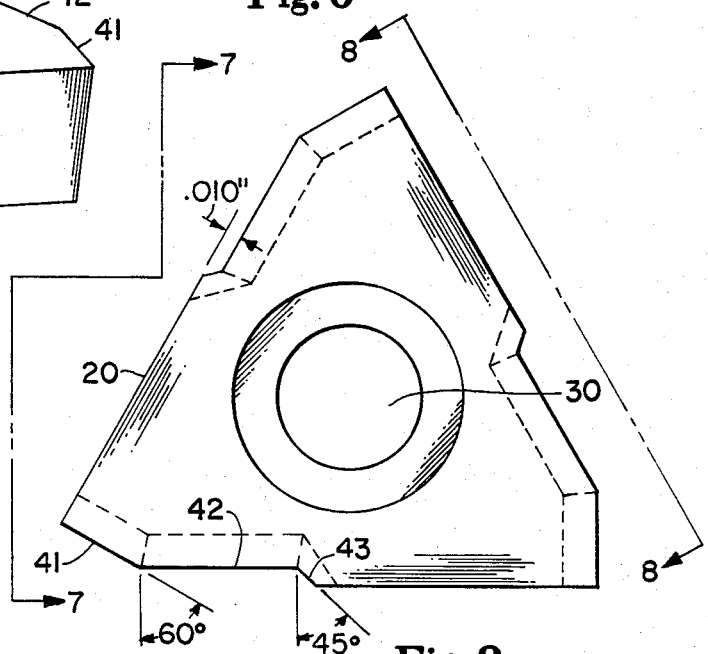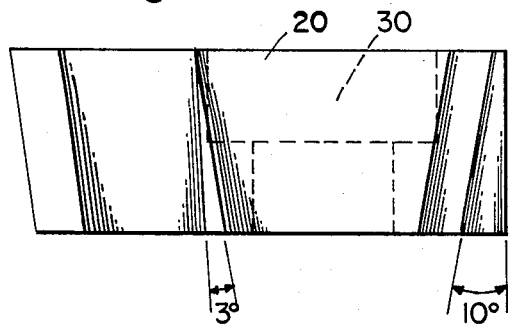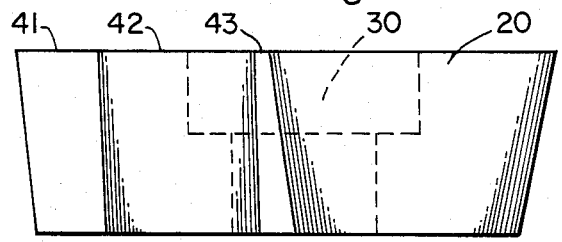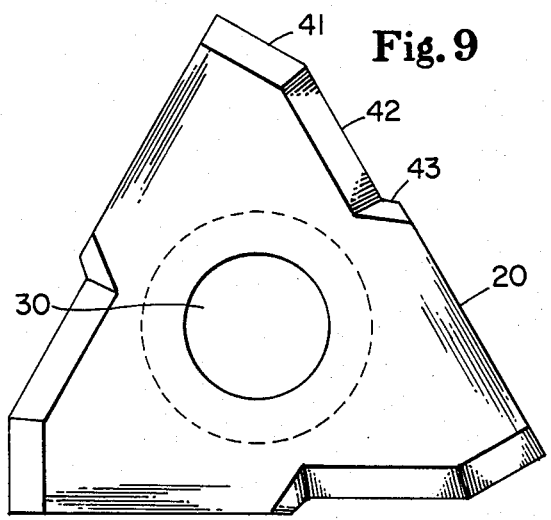

CUTTING TOOL

This invention relates to a cutting tool and in particular relates to tools used to enlarge the diameter of holes in metal. In enlarging the diameter of an already formed deep hole, it is frequently advantageous to use a cutting tool provided with a replaceable cutting element. It is important that the cutting element be sufficiently and properly mounted to prevent movement of the cutting element during operation. It is also frequently desirable to enlarge an already formed hole, to counterbore the hole, and to face the counterbored hole by utilizing cutting tools mounted on a longitudinal rod. One of the problems which arises from the use of such a tool having multiple cutting elements is the removal of chipped material.

It is the principal object of this invention, therefore, to provide a cutting tool consisting of a cylindrical rod or bar being provided with multiple cutting elements, the first cutting element resting on one diameter, the second cutting element on a second and larger diameter portion of the bar and a third cutting element affixed to a third and larger diameter portion of the bar.

Another object of my invention is to provide a tool having replaceable cutting elements so constructed so that movement of the cutting element relative to the tool bar during cutting is such that chips removed by the cutting element may pass freely away from the cutting element.

Still another object of my invention is to provide a cutting element so constructed that it may be secured to the tool bar and provide for selected multiple cutting edges.

The particular cutting tool which I utilize is designed to first ream the driven hole, second countersink the hole and third, to spot face the hole after it has been reamed and countersunk. The cutting element used for reaming the hole is provided with a clearance angle of 11 degrees and has cutting edges and is indexible to three cutting positions. The countersinking tool is indexible and is provided with multiple cutting edges and may be automatically positioned. The countersinking portion of the tool and the countersinking cutter is provided with a 10 degree clearance angle. The third cutter is similar to the cutter used for boring and is positioned on the shaft so that it spot faces the hole. Each of these cutting elements is indexible.

It is, therefore, an additional object of my invention to provide indexible cutters mounted on a boring bar so that the indexible cutters may be positioned successively to lessen the necessity of replacement.

Another object of my invention is to provide a cutting tool or boring bar which has cutters which are triangular in shape and having three edges which are indexible to cutting positions. The cutting element is so designed in relation to the boring bar so that it may be reoriented after each cutter is worn and this is accomplished by loosening a set screw, rotating the cutter and tightening the setscrew.

Another object of my invention is to mount the cutters so that the cutting point in each member, whether reaming, countersinking or facing, projects only about ½ millimeter or less beyond the circular cross-section of the portion of the boring bar to which it is indexibly secured.

Still another object of my invention is to provide a cutter bar with indexible readily replaceable inserts which substantially reduce down time and replacement costs.

Other objects and details of construction and economies of operation will be readily apparent from the detailed description to follow of the cutters and of the mounting for the cutters on the boring bar.

The objects and advantages of this invention will be apparent from the detailed description to follow and from a reference to the accompanying drawings in which the several views are taken looking in the direction of the arrows at the end of the section lines.

FIG. 5 is a perspective of the cutting element utilized for counterboring;

FIG. 6 is a top plan view of the cutting element shown in FIG. 5;

FIG. 7 is a side elevation view taken along the line 7—7 of FIG. 6;

FIG. 8 is a side elevation view taken along the line 8—8 of FIG. 6; and

FIG. 9 is a bottom plan view of the cutting element as shown in FIG. 5.

Figure 1:
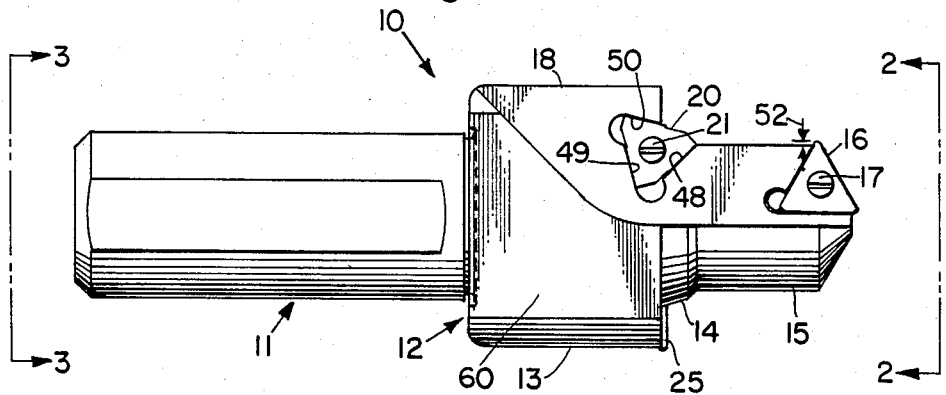
FIG. 1 is a side elevation view of an insert type cutting tool embodying the invention.
Figure 2:
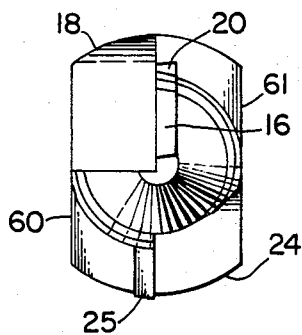
FIG. 2 is an end view taken along the line 2—2 of FIG. 1.

Referring in particular to the drawings, I show in FIG. 1 a bar indicated generally at 10 which has a shank area 11 and cutting area 12, a large diameter portion 13, a small diameter portion 14 and a still smaller diameter portion 15, the last three diameters being in size and relation to each other. The cutting tool at its lower diameter 15 is provided with a triangular indexible carbide cutting element 16, secured in position by means of a setscrew 17.

This insert 16 is triangular in shape, the triangle being formed around an internal diameter of ¼ to ⅜ inches. The triangular cutter is ⅛ inch thick and tapers from its upper edge to its lower edge to provide an 11 degree clearance angle (standard). An appropriately sized opening is provided for the setscrew 17. A flute 18 is cut in the bar diameters 13, 14 and 15 so that the chips from reaming cutting element 16 and from cutting element 20 may be extruded during operation.

Figure 4:
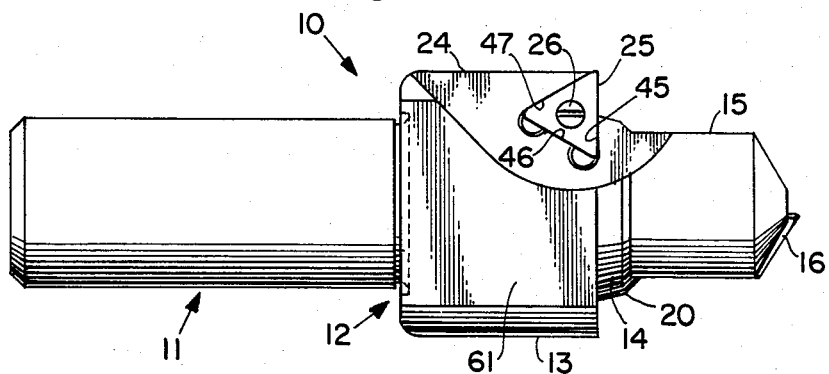
FIG. 4 is a side elevation view of the boring tool embodying the invention taken at an angle 180 degrees from that shown in FIG. 1.

Similarly, within this flute 18, a second cutting element 20 is provided for countersinking and is indexibly secured with the flute 18 secured by a setscrew 21. An additional flute 24 is provided in the bar 10 as shown in FIG. 4 to receive a facing cutting element 25 secured by a setscrew 26. The same or similar type of cutting element used for reaming and shown in FIG. 1 and FIG. 4 as 16 may be utilized for facing.

Referring in particular to the cutting element 20 illustrated in FIGS. 5, 6, 7, 8 and 9, I show a carbide cutting element having an internal circumference of ¼ or ⅜ inches and thickness of 0.125 inches.

A shown in FIG. 6 there are three cutting edges for each cutting position of the indexible insert. Each of the cuttings forms a cutting edge the first of which such as 41 form a 60° angle with the center line of the cutting element as shown in FIG. 6. The combination of three indexible positions for the countersinking insert and three indexible positions for the reaming and facing cutters provide adequate cutting capacity with great stability and the configuration of the tools provide for freedom from chatter.

This invention is particularly directed to the manufacture and finish of a hydraulic receptacle to accomodate an O ring and fitting having standard dimensions.

It is essential that the receptacle have close tolerances in order that a tight fit will result and provide a secure seal.

In the present state of the art, the hydraulic fitting requires a receptacle having a 15° angle to the perpendicular side wall of the member. The cross section of the fitting has a side wall which has an angle to the perpendicular of 15°, and from the lower edge of the side wall a further wall extends having an angle of 45°. At the upper edge of the opening a radius of 0.005 to 0.010 inches is required.

To accomplish this I use the cutting element described below and more particularly shown in FIGS. 5, 6, 7, 8 and 9.

Referring to FIG. 6, I show a cutting element having identical cutting edges at the apex of three points. Each of these indexible cutting edges is adapted when selected to perform the function required to manufacture the fitting described in the foregoing paragraph.

Reference to FIG. 6 shows a cutting edge 41, which lies at an angle of 60° to a second cutting edge 42, and a third cutting edge 43 which lies at an angle of 30° to the second cutting edge.

Referring again to FIGS. 1 and 4, the position of the cutters in the tool permits the chipped material to be extruded along the flute 18 and the flute 24.

The mounting of the cutting elements 16, 20 and 25 is such that a single insert provides three separately usable cutting edges. The inserts are so designed that they assure chip size compatible with clearance by flushing actions. The screws such as 17, 21 and 26 are flush with the bottom surfaces of the flutes 18 and 24 and permit the ready release of chip material. Other port cutting tools presently used and prior to my invention require clamps to firmly secure the cutting element causing chip back up and the resultant increased loss of time and energy.

Further, as previously described, the inserts 16, 20 and 25 are firmly secured against walls 45, 46, 47, 48, 49 and 50 as shown in FIGS. 1 and 4.

Figure 3:
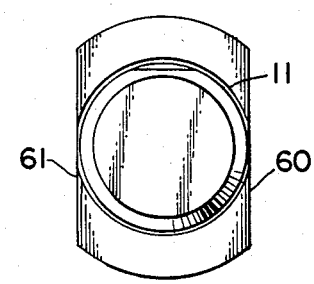
FIG. 3 is an end view taken along the line 3—3 of FIG. 1.

Refer now to FIG. 3 and I provide flat surfaces 60 and 61 on opposite sides of the bar 10 particularly at 13 (FIG. 4). As a result of the flattening I obtain proper coolant flow to the cut, resulting in a finer finish, longer tool life and increased speeds.

The inserts 16, 20 and 25 are secured to the bar 10 at the lower portion within the flutes 18 and 24 and rest upon three walls to insure stability and accuracy in positioning. Refer to flute 24 in FIG. 4 and reference made to side walls 45, 46 and 47. The great stability it required to spot face chatter free and, therefore these seating walls are provided such as 45, 46 and 47.

Referring also to the cutting element 20, I provide three seating walls 48, 49 and 50. These walls are perpendicular to the axis of the bar 10. The walls referred to as 45, 46 and 47 are inclined at an angle of 11° to produce positive cutting action at high speeds and feeds as those terms are defined in the art.

The metal chip material produced by the cutting edges described for the three cutting elements are compatible to being removed thru the flutes 18 and 24.

To eliminate chatter I have provided the tool with a clearance 52 between the cutting insert 16 and body diameter 15 of no more than 0.008 inches.

It is readily apparent, therefore to persons skilled in the art that the tool described in this application with its particularly constructed cutting edges will result in the manufacture of a proper part for receiving a hydraulic fitting.

Although my invention is described with reference to a preferred embodiment, it will be apparent to those who are skilled in the art that additions, modifications and substitutions not specifically described and illustrated in the preferred embodiment may be made which will fall within the purview of the following claims:

I claim:

1. A cutting tool comprising: a rod having an upper cylindrical body and a lower cylindrical body, said lower cylindrical body having flat surfaces on opposite sides, a pair of flutes formed in said lower cylindrical body, a triangular cutting element including a mounting hole located in said lower cylindrical body, means passing through said hole for detachably securing said triangular cutting element to said lower cylindrical body, said cutting element having at least a portion thereof projecting outwardly of said body and said cutting element abutting the surface of a flute formed within said body, a second cutting element triangular in shape and abutting walls formed in said flute portion of said body and having three cutting edges projecting beyond the first mentioned triangular cutting element lying in the flute containing said first triangular cutting element, and a third triangular cutting element having a cutting edge, said element secured against walls in said body and having a cutting edge projecting beyond the cutting edges of said first and second mentioned cutting elements, said last mentioned cutting element lying in a plane in the flute 180° opposite said first mentioned flute, said cutting element tool having a facing cutting element indexable to three positions for facing and provided with a 110° clearance angle.

* * * * *

UNITED STATES PATENT AND TRADEMARK OFFICE
CERTIFICATE OF CORRECTION

PATENT NO. : 4,505,626

DATED : March 19, 1985

INVENTOR(S) : Craig Benhase

It is certified that error appears in the above-identified patent and that said Letters Patent is hereby corrected as shown below:

Column 4, line 53, "$110°$" should read -- $11°$ --.

Signed and Sealed this

Twenty-seventh Day of August 1985

[SEAL]

Attest:

DONALD J. QUIGG

Attesting Officer   Acting Commissioner of Patents and Trademarks